M. WAGNER.
CLUTCH PEDAL CONTROL FOR AUTOMOBILES.
APPLICATION FILED DEC. 5, 1919.
1,418,340.  Patented June 6, 1922.
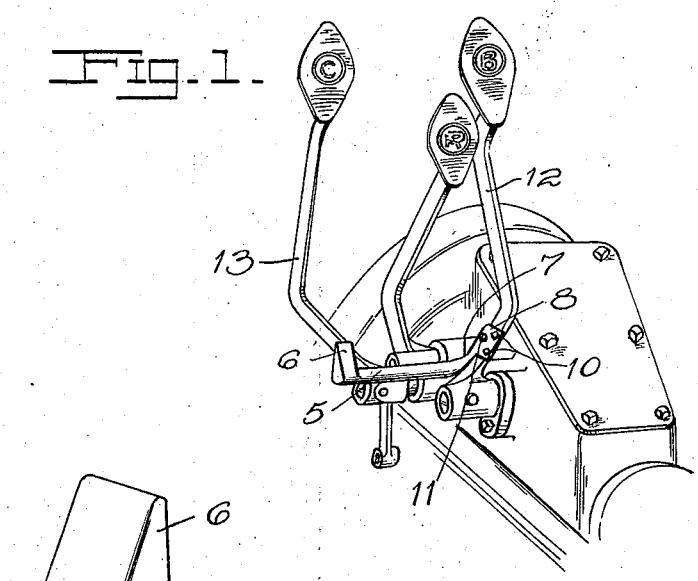
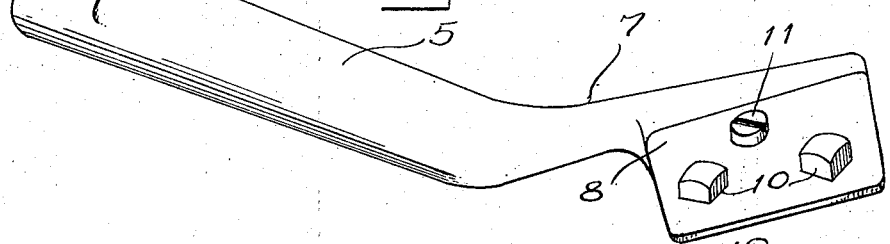
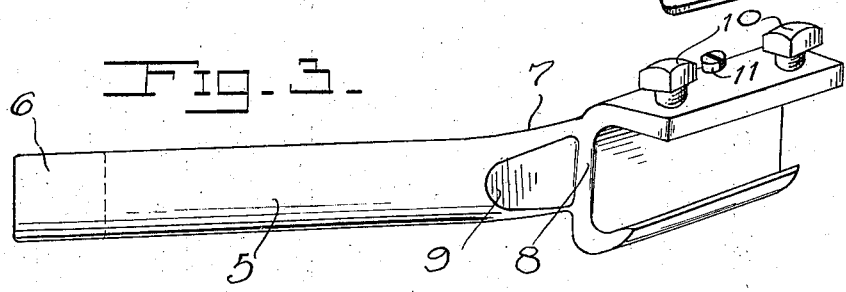
INVENTOR.
Max Wagner
BY
ATTORNEYS.

UNITED STATES PATENT OFFICE.

MAX WAGNER, OF CHICAGO, ILLINOIS.

CLUTCH-PEDAL CONTROL FOR AUTOMOBILES.

1,418,340. Specification of Letters Patent. Patented June 6, 1922.

Application filed December 5, 1919. Serial No. 342,805.

*To all whom it may concern:*

Be it known that I, MAX WAGNER, a citizen of the United States, residing at Chicago, in the county of Cook and State of Illinois, have invented new and useful Improvements in Clutch-Pedal Controls for Automobiles, of which the following is a specification.

This invention relates to improvements in automobile transmission devices and refers more particularly to clutch actuating attachments for automobile foot brakes.

The principal object of the invention is to provide a simple and inexpensive device adapted to be attached to the brake pedal of a Ford automobile in position to actuate the clutch pedal to place the clutch in neutral position when the foot brake is applied.

With the foregoing object in view, this invention comprises the new and useful details of construction and arrangement, which will be fully described herein, illustrated in the annexed drawings, and claimed more specifically hereinafter.

In the drawings,

Figure 1 is a fragmentary perspective view of an automobile transmission and the usual foot pedals, with the improved attachment in place on the foot brake pedal; Figs. 2 and 3 are detail perspective views of the device detached.

Referring now to the drawings, numerals 12 and 13 designate, respectively, the brake pedal and the clutch pedal, mounted to swing longitudinally of the automobile, the brake pedal being spaced laterally of the clutch pedal in the usual manner, the reverse pedal being positioned therebetween. To the lower portion of the brake pedal shank is fixed the device which is the subject matter of the present application for patent. This device comprises an arm 5 extended laterally outward from a clamp head 8, the arm being bent slightly forward at 7. Clamp head 8 may be of any suitable design to fit about the pedal shank and in the present embodiment it is shown with two jaws positioned to receive the shank therebetween. Clamp bolts 10 are provided to engage the shank in an obvious manner. The under face of the arm 5 is cut away at 9 to allow the device to fit snugly in place against the curved pedal shank.

At the outer end of arm 5 is a cam abutment 6 positioned to contact with the shank of the clutch pedal 13 when the brake pedal is swung forward to apply the service brake. The relative position of cam abutment 6 is such that when the brake pedal is swung forward to apply the brake, the cam presses against the clutch pedal shank and swings it forwardly to throw the clutch into the neutral position. As a means for adjusting the relative position of arm 5 and cam abutment 6, a set screw 11 is provided on one of the jaws of clamp 8 in position to be screwed against brake pedal shank 12 to prevent the tendency of the arm to twist out of the desired position when the clamp bolts 10 are screwed down.

By means of screw 11 the arm 5 is set in the proper position on shank 12 and after the adjustment has been made the bolts are tightened up to secure the device.

From the foregoing description it will be readily seen that the invention herein disclosed is a simple and inexpensive brake pedal attachment which will effectively actuate the clutch pedal of an automobile when the brake is applied, thus to shift the transmission into the neutral position, and at the same time the device does not interfere with the ordinary use of the clutch pedal. The device effectually prevents application of the service brake without the clutch also being placed in neutral position.

I claim:

The combination with the brake and clutch pedals of a motor vehicle, the clutch pedal having a shank which extends laterally at its inner end with respect to the shank of the brake pedal; of a clutch pedal actuator carried by the brake pedal shank and comprising a clamping member having means for adjustable connection to said shank, an arm extending laterally from said member, and a cam member on the outer end of said arm, said cam member extending laterally from the arm for engagement with the aforesaid laterally extending portion of the clutch pedal shank.

In testimony whereof I affix my signature.

MAX WAGNER.